(12) United States Patent  (10) Patent No.: US 7,721,517 B2
Hunt et al.  (45) Date of Patent: May 25, 2010

(54) HYBRID ELECTRIC TOOL CARRIER

(75) Inventors: Kenneth Edward Hunt, Rock Hill, SC (US); Jim Milton Shoemaker, Horicon, WI (US); Philip Eugene Ferree, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/275,402

(22) Filed: Nov. 21, 2008

(65) Prior Publication Data

US 2009/0288381 A1    Nov. 26, 2009

Related U.S. Application Data

(60) Continuation of application No. 11/273,141, filed on Nov. 14, 2005, now abandoned, which is a division of application No. 10/732,634, filed on Dec. 10, 2003, now Pat. No. 7,017,327.

(51) Int. Cl.
*A01D 34/00*    (2006.01)
(52) U.S. Cl. .......................................... 56/10.7; 56/202
(58) Field of Classification Search .................. 56/10.7, 56/202, 320.2, 13.3
See application file for complete search history.

(56) References Cited

U.S. PATENT DOCUMENTS

| | | | | |
|---|---|---|---|---|
| 6,012,273 A | * | 1/2000 | Ogasawara et al. | 56/16.6 |
| 6,082,084 A | * | 7/2000 | Reimers et al. | 56/11.9 |
| 6,454,032 B1 | * | 9/2002 | Teal et al. | 180/6.62 |
| 6,591,593 B1 | * | 7/2003 | Brandon et al. | 56/10.6 |
| 2002/0083694 A1 | * | 7/2002 | Nagai et al. | 56/16.8 |
| 2002/0124542 A1 | * | 9/2002 | Ishimori | 56/17.5 |
| 2003/0106296 A1 | * | 6/2003 | Ishimori | 56/10.8 |
| 2003/0182914 A1 | * | 10/2003 | Shibata et al. | 56/202 |
| 2004/0112027 A1 | * | 6/2004 | Komorida et al. | 56/202 |
| 2004/0200654 A1 | * | 10/2004 | Hatsuda et al. | 180/243 |

* cited by examiner

*Primary Examiner*—Árpád Fábián-Kovács

(57) ABSTRACT

A hybrid utility vehicle includes a tool-supporting frame and an electrical power source driven by an engine. Right and left rear wheels independently driven by permanent magnet electric motors and front wheels electrically steerable over a range of approximately 180 degrees operate under the control of a vehicle controller responsive to steering and speed input controls to provide zero turn radius operation with minimum slippage and tire scuffing. Space efficiency provided by the electric. steering and an electrically driven tool deck facilitate a variety of tool mounting configurations including a rear discharge deck with a chute passing under the vehicle frame between the driven wheels. An inverter connected to the electrical power source provides 110/220 volt output. The power source also functions as a high powered, high rpm, low noise starter motor.

2 Claims, 8 Drawing Sheets

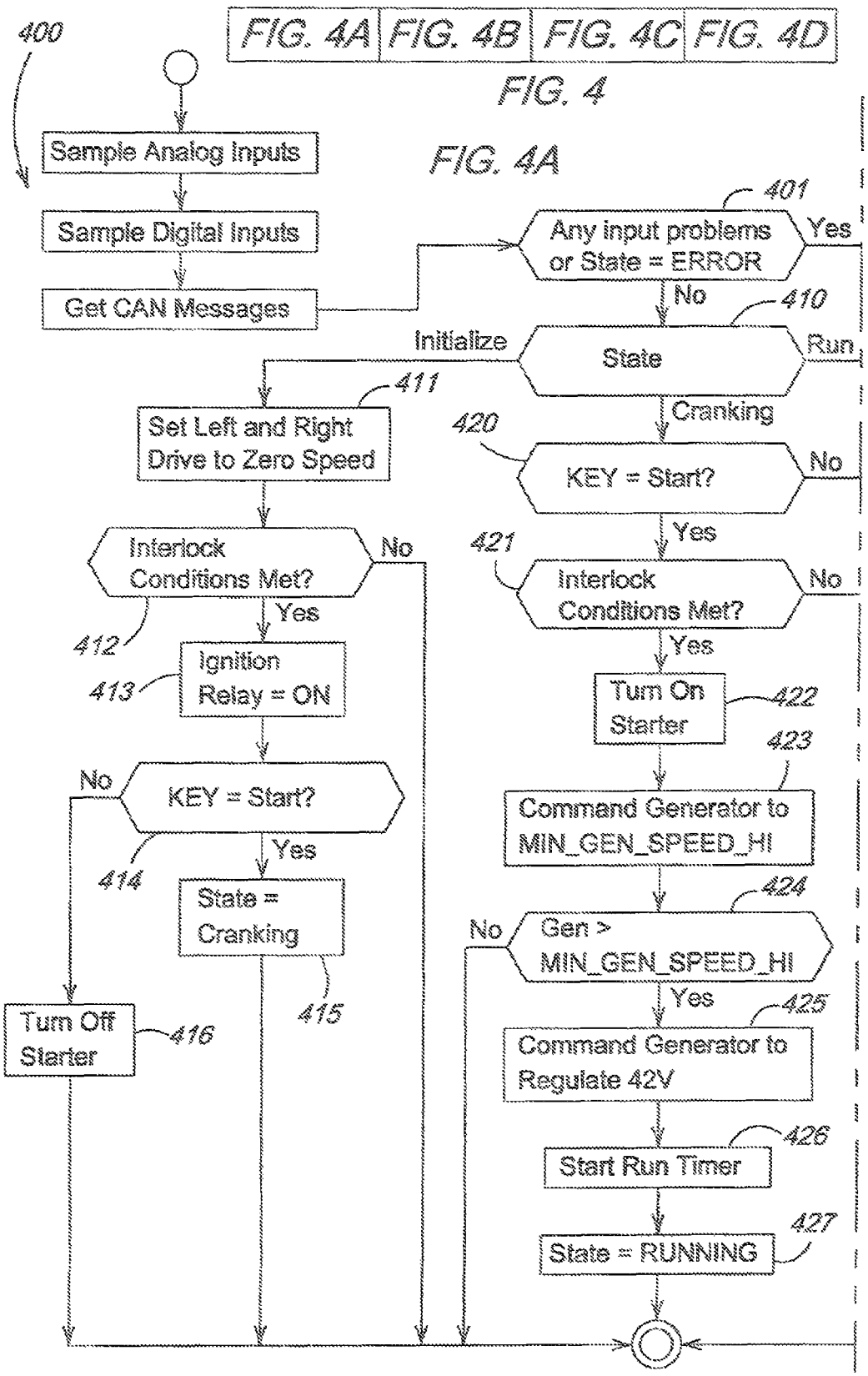

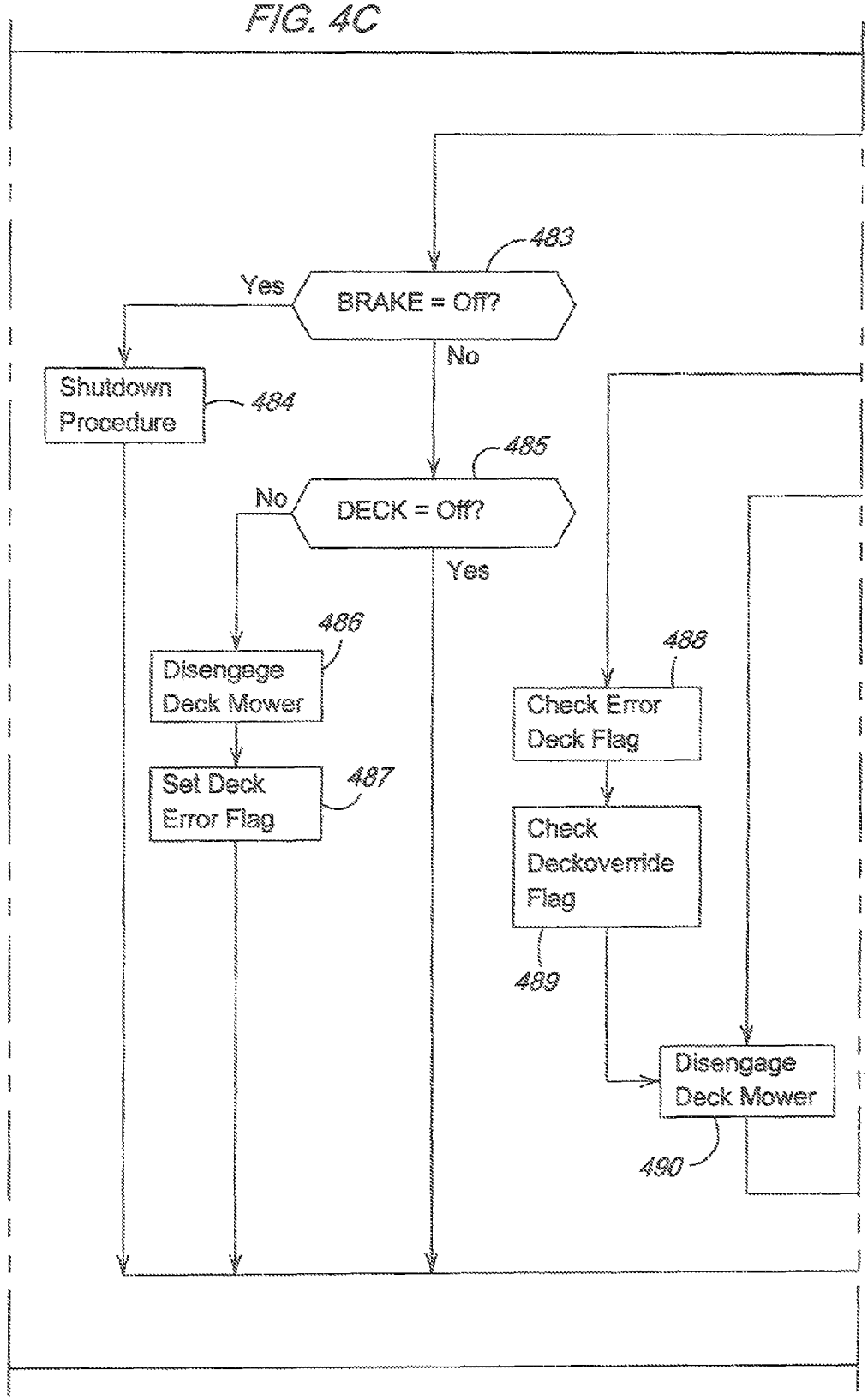

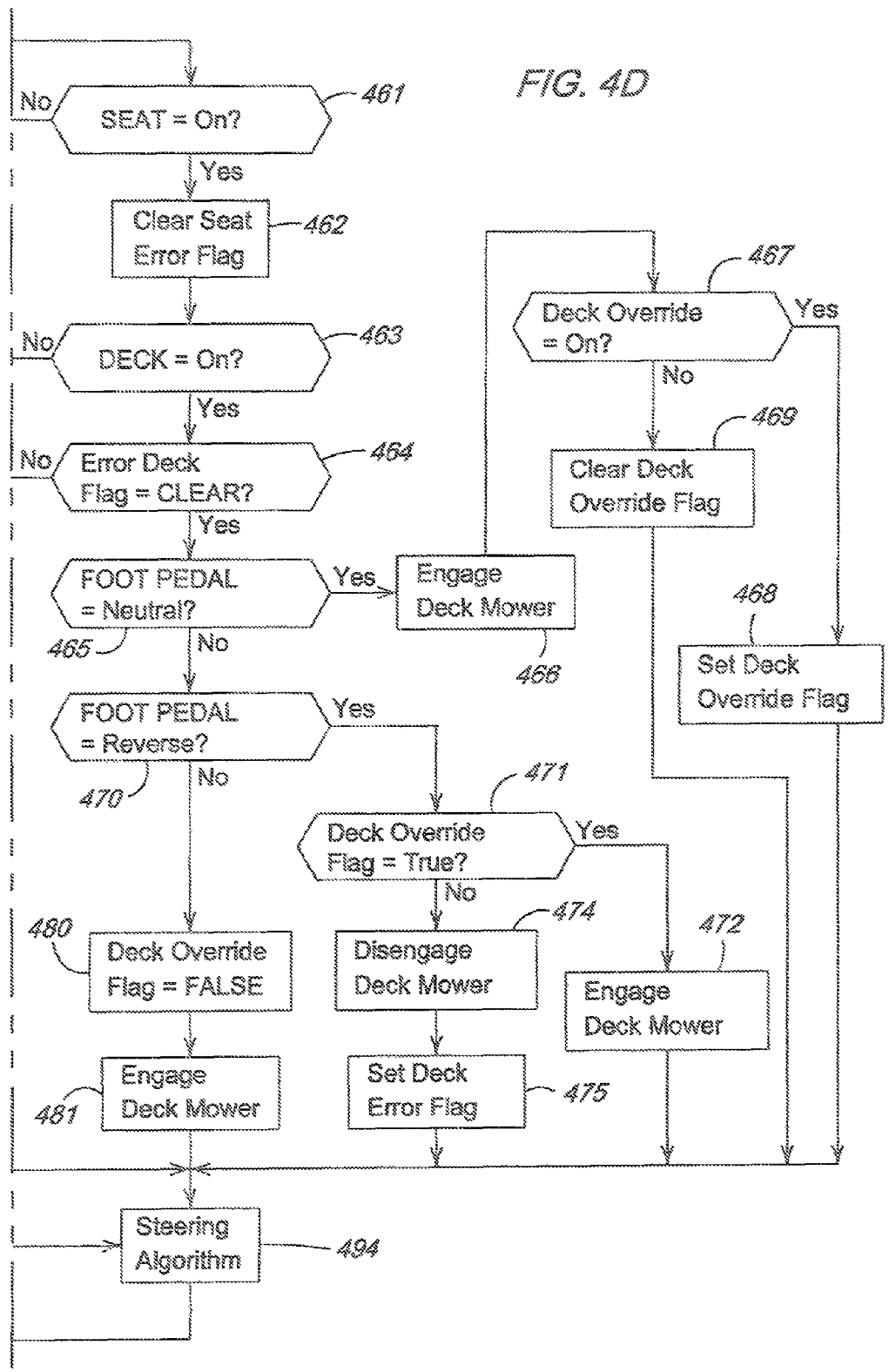

HYBRID ELECTRIC TOOL CARRIER

This application is a continuation of application Ser. No. 11/273,141 filed on Nov. 14, 2005 now abandoned which is a divisional of Ser. No. 10/732,634 filed 10 Dec. 2003, now U.S. Pat. No. 7,017,327.

FIELD OF THE INVENTION

The present invention relates generally to utility vehicles and more specifically to off-road hybrid electric vehicles such as lawn and garden tractors.

BACKGROUND OF THE INVENTION

Off-road utility vehicles such as garden tractors typically include a basic carrier unit with an internal combustion engine and electrical power source. The carrier unit is powered by the engine, either through a direct mechanical drive or a hydraulic drive, or indirectly through the electrical power supply and one or more electric traction motors.

The carrier unit accepts various selectively replaceable attachments which are powered by the engine and/or electrical source. For example, a riding lawn mower includes a deck supported under a vehicle frame. Usually the cut material discharge chute is located on the side of the deck, and therefore the ability to trim on either side of the machine is limited. Some rear discharge machines have chutes which pass over a rear frame portion and transmission for directing cut material into a hopper. For example, U.S. Pat. No. 6,631,607 shows a rear discharge chute which directs cut material over a pair of hydrostatic transmissions. Avoiding interference with drive transmission structure prevents optimization of rear discharge chute size and configuration, and most rear chutes have a smaller capacity than that necessary for optimum machine productivity.

Conventional transmissions for riding mowers and similar utility vehicles often require a differential lock for maximum traction. However, when making tight turns, such as when mowing around a tree, wheel slip will cause tire scuffing and will tear up turf.

Vehicles having front caster wheels and independently drivable rear wheels provide zero turn radius maneuverability and eliminate most wheel slip. By driving one drive wheel forwardly while driving the other in reverse, a spin turn maneuver may be accomplished. Zero turn radius vehicles are sometimes uncomfortable for some first time users to operate, and operation on slopes can be difficult with the front caster wheel construction. Many people prefer a positive front wheel steer arrangement with a conventional steering wheel. Commonly assigned U.S. Pat. No. 6,454,032 shows a drive and steer type of arrangement providing automotive type of controls which are more comfortable to most consumers, but positive front wheel steer for better control on slopes is lacking. It is desirable to provide a front wheel steer option for utility vehicles with control that can be easily incorporated into the vehicle electronic controller. The rear wheels should be capable of steering the vehicle by driving when the front wheel steer option is disabled or not selected. On start-up of the vehicle, the position of the steered front wheels should be ascertainable.

For compact, high power drive arrangement in hostile environments such as encountered by lawn and garden tractors and other utility vehicles, brushless permanent magnet direct current (PMDC) motors and permanent magnet electrical power generators are available. With permanent magnet generators, the option to vary field current and thus the magnetic flux to vary output voltage is unavailable. Driving the generator at different speeds causes considerable variation in the output voltage. To provide sufficient operating voltage, the generator must either be wound for sufficient voltage at low engine speed which results in high over-voltage at full engine speed, or be wound for high speeds which requires constant full engine speed operation even if power requirements are low. Components have to be sized or a protective circuit such as an intermediate bus and capacitors or the like provided to accommodate over-voltages and prevent damage to the system.

Typical ring gear starter configurations for hybrid vehicles are noisy, and cranking speed is relatively slow. The starter motor adds cost and weight to the vehicle.

More consumers are desiring 110 or 240 volt output from the utility vehicle so electrical tools can be operated and back-up house power can be provided as necessary. Engine overload and engine stoppage, particularly upon initial loading of the electrical system, can be a problem.

SUMMARY OF THE INVENTION

It is therefore an object of the present invention to provide an improved hybrid utility vehicle. It is a further object to provide such a vehicle which overcomes one or more of the aforementioned problems.

It is another object to provide a utility vehicle having an improved steering arrangement. It is a further object to provide such a vehicle which has improved drive arrangement.

It is yet another object of the present invention to provide an improved hybrid utility vehicle. It is a further object to provide such a vehicle which facilitates better placement of vehicle components and attachments.

It is another object to provide an improved hybrid utility vehicle having improved power distribution structure.

In one embodiment of the invention, a hybrid utility vehicle includes a tool-supporting frame and an electrical power source driven by an engine. Right and left rear wheels independently driven by permanent magnet electric motors and front wheels electrically steerable over a range of approximately 180 degrees operate under the control of a vehicle controller responsive to steering and speed input controls to provide zero turn radius operation with minimum slippage and tire scuffing at varying vehicle speeds. Space efficiency provided by the electric steering and an electrically driven tool deck facilitate a variety of tool mounting configurations including a rear discharge deck with a chute passing under the vehicle frame between the driven wheels. The electric wheel motor drives are on the external side of the frame rails, and the cut material conveying chute may be mounted much lower than is possible in a traditional lawn tractor layout which requires chute routing over a transmission. The hybrid construction eliminates need for a traditional transmission so the space can be used for moving grass and other cut material to a rear hopper. Also, the material chute located in the middle rather than at a side of the machine facilitates trimming. unhindered by discharge structure on either side of the machine.

An inverter connected to the electrical power source provides 110 and/or 220 volt output for utility power use so hand tools and lawn tools can be operated and back-up house power can be provided from the vehicle. The power source also functions as a high powered, high rpm, low noise starter motor. The controller filters operator speed requests utilizing a torque control map. A control algorithm avoids engine overload and engine stoppage by causing electrical load to be taken from the battery pack and gradually applying generator load to allow governor to match engine droop.

The hybrid vehicle can be operated from a battery pack when quiet operation is required. The vehicle 10 does not require hydraulic systems and is particularly suited for operation in environments where oil leaks pose a particular problem, such as on golf course.

These and other objects, features and advantages of the present invention will become apparent from a reading of the description which follows when taken with the drawings.

BRIEF DESCRIPTION OF THE DRAWINGS

FIGS. 4A-4D show a logic flow chart for operation of the controller of FIG. 3.

DESCRIPTION OF THE PREFERRED EMBODIMENT

Figure 1:
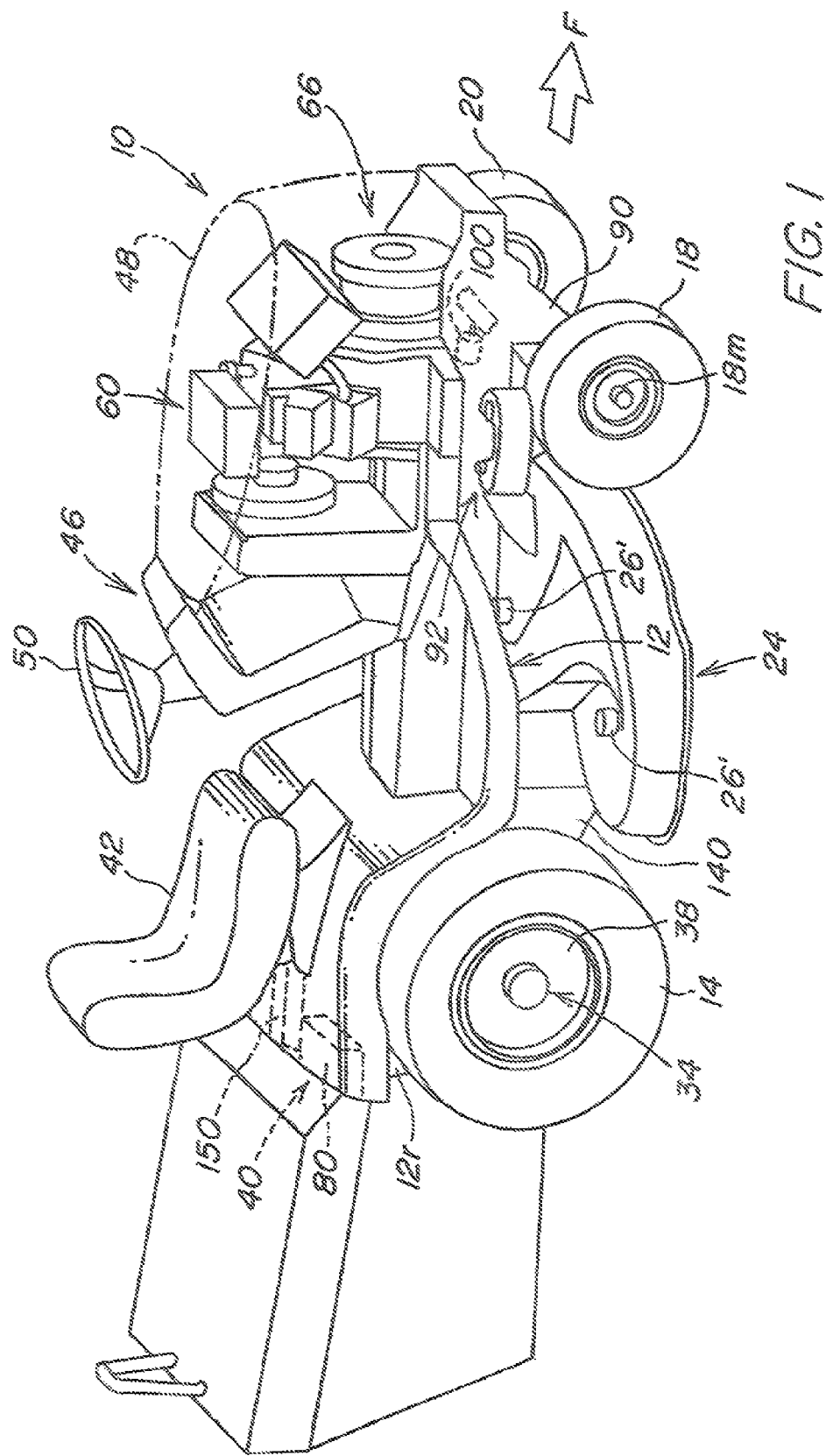
FIG. 1 is a side perspective view of a hybrid utility vehicle with portions broken away to better show the component layout on the vehicle.

Referring now to FIG. 1, therein is shown a utility vehicle 10 such as a riding mower or other grounds care machine having a tool-carrying frame 12 supported by right and left rear driven wheels 14 and 16 and front steerable wheels 18 and 20. A driven tool 24, shown in FIG. 1 as a mower deck, is supported from the underside of the frame 12 and includes a plurality of driven blade members 26 (FIG. 3) powered by electric motor structure 26'. The electric motor structure 26' may include a permanent magnet dc motors 26' individually driving each of the blade members 26 or other suitable drive arrangement including but not limited to a single motor driving the blade members 26 through a belt drive. The motors 26' can be "pancake" type motors to for more clearance on the top of the deck 24.

The frame 12 includes a rear frame portion 12r on each side of the vehicle 10 supporting right and left integrated wheel motor assemblies 34 and 36, each having a brushless permanent magnet dc motor 34' and 36' and a planetary reduction gear structure 34g and 36g located substantially entirely outwardly of the rear frame portion 12r and generally within rims 38 of the wheels 14 and 16. The construction of the rear frame portion 12r and the compact wheel motor assemblies 34 and 36 leaves a rearwardly opening accommodation space 40 between the assemblies and below the top of the rear frame portion 12r unencumbered with transmission or other wheel drive structure. A seat 42 is supported from the top of the rear frame portion 12 behind an operator control area 46 and a hood area 48 which extends forwardly from the control area. A steering control 50 is located in the area 46.

An internal combustion engine 60 centered behind the front wheels 18 and 20 is supported in the hood area 48. A combination starter/alternator 66 is supported at the forward end of the engine 60 between the front wheels 18 and 20 to generate electrical power using the engine 60 and to provide high rpm, high torque engine starting at a low noise level. In the embodiment shown for a conventional lawn and garden tractor, the engine provides about fifteen horsepower and the alternator puts out about thirteen kilowatts of power at full engine power from a three phase permanent magnet brushless generator. As a starter, the depicted starter/alternator provides combustion engine cranking torque of greater than 40 Nm. It is to be understood that other engine/generator combinations and power outputs could be used.

A rectifier/inverter 68 (FIG. 3) is connected to the alternator which operates to boost generator voltage above the back emf of the generator. Current is injected into an inductance to provide the voltage increase. An output 70 is connected to a battery pack 74 and to bus 76 having a bus voltage above 36 volts and typically about 42 volts. By operating the generator at an output level below the voltage on the bus 76 good efficiency over a wide range of engine speeds is achieved without need for a complicated voltage management scheme. With a back emf lower than the bus voltage, the electronics are designed to boost the generator output up to the bus voltage. When generating, controller transistors in the rectifier/inverter 68 are commutated 180 degrees out of phase from motoring. The inductance of the machine thus adds the supply voltage to the back emf voltage which raises the output over the bus voltage for charging the batteries. The necessary bus voltage can be generated efficiently over a wide range of engine speeds which allows running the engine at low speed for quiet operation when full power is not needed. The bus 76 is connected to an inverter 80 with an 110 volt or 240 volt outlet 82 which can be conveniently located adjacent the accommodation space 40 near the rear of the vehicle 10 for powering hand tools, providing emergency power to a building, and the like. The battery pack 74 can be of thin film absorbed glass mat or other compact construction which can be located adjacent the seat 42 near the inverter 80.

Figure 2:
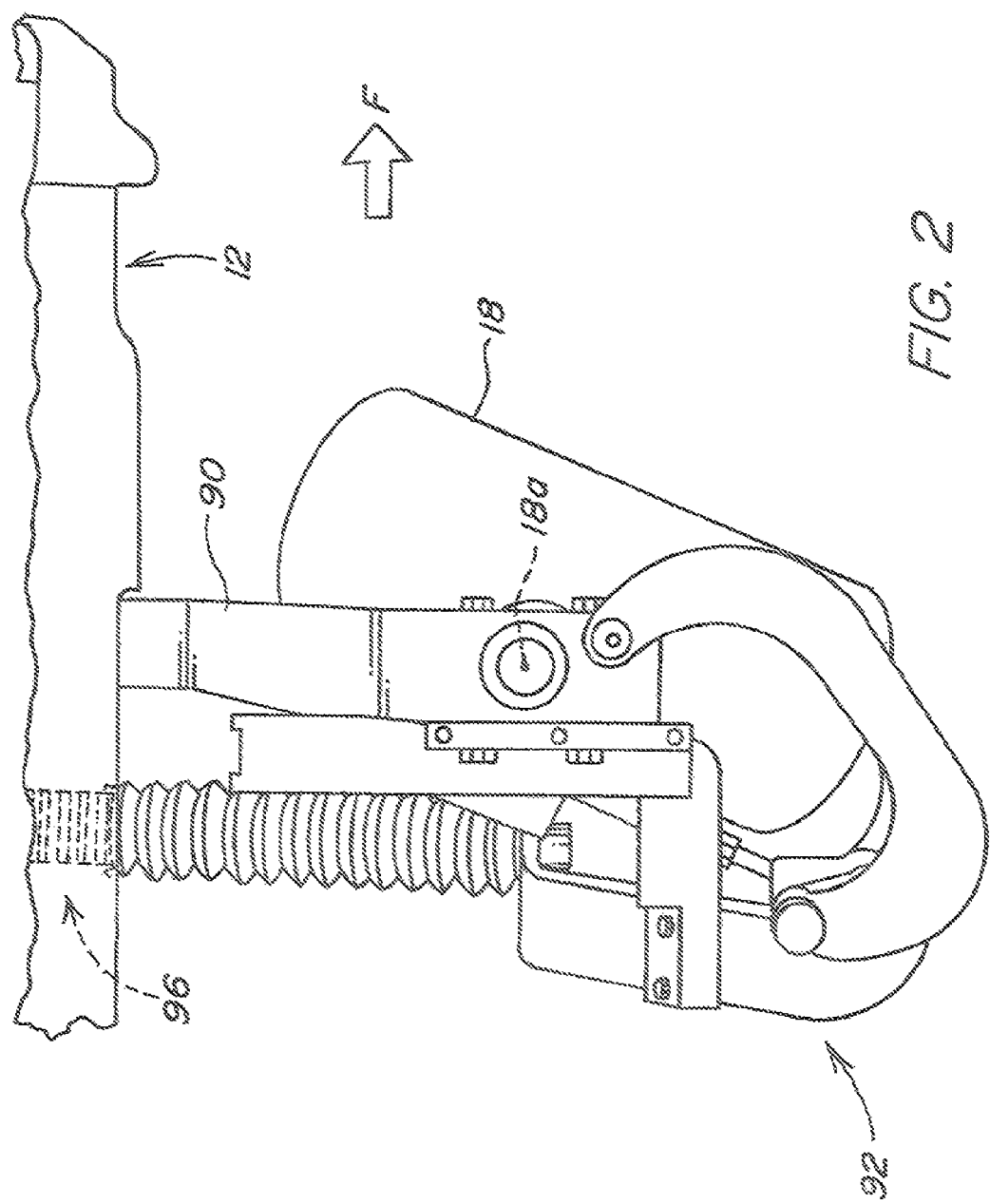
FIG. 2 is an enlarged top view of steerable front wheel structure on utility vehicle of FIG. 1.
Figure 3:
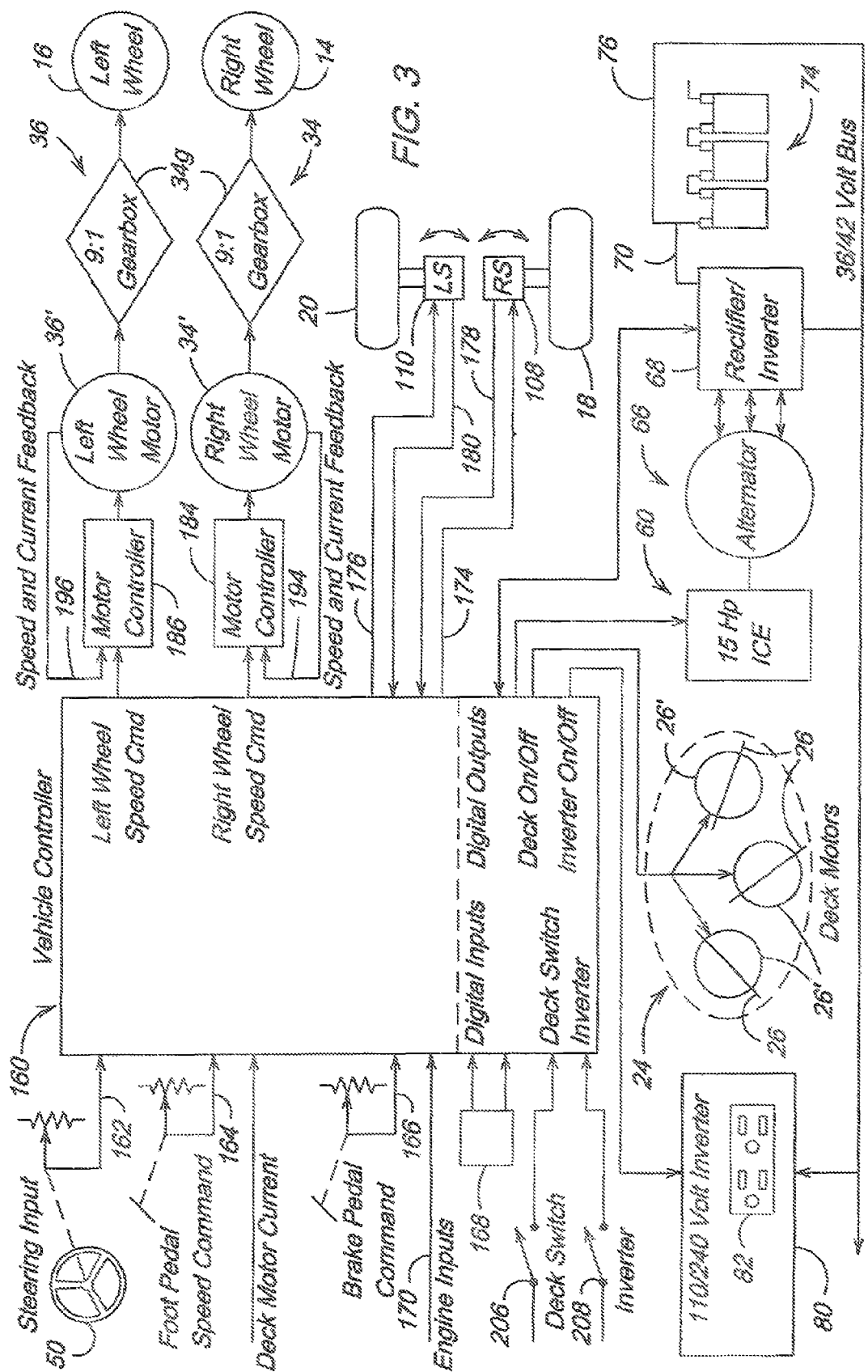
FIG. 3 is a control system block diagram including an electronic vehicle controller for the vehicle of FIG. 1.
Figure 4B:
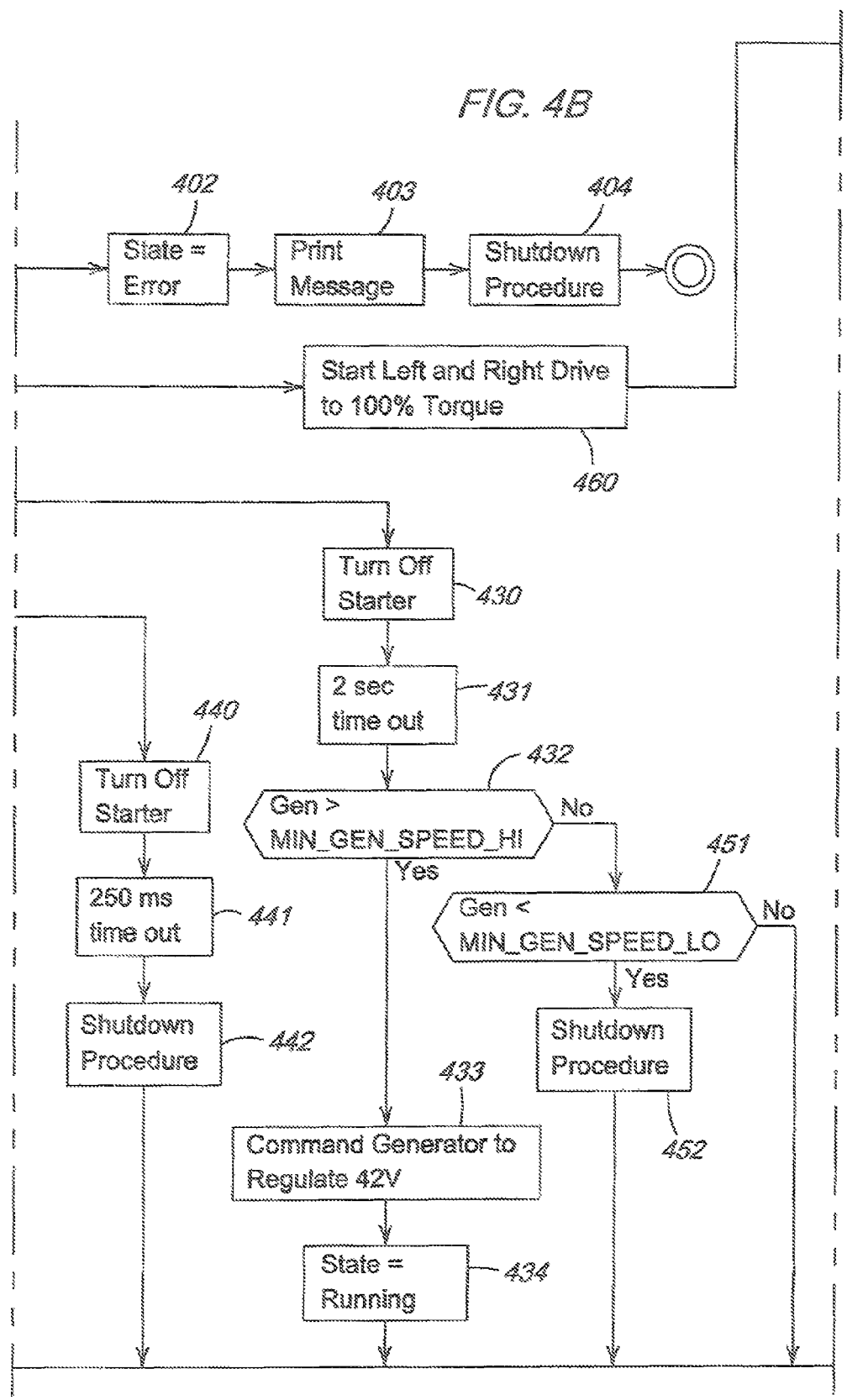

The front wheels 18 and 20 as shown in FIGS. 1 and 2 are steerable wheels movable over a range of about 180 degrees from a zero radius right turn position to a zero radius turn left position. In FIG. 2, the wheel 18 is shown approaching the left-most turn position. The wheels 18 and 20 are connected to a transverse axle member 90 for pivoting about upright axes (see 18a in FIG. 2), and a steering linkage 92 generally of the type shown and described in commonly assigned U.S. Pat. No. 6,456,925 provides positive steering of the wheels through a rack and pinion structure 96. In one embodiment (FIG. 1), an electric motor 100 powers the rack and pinion structure 96 and provides a drive by wire function which is independent of a mechanical linkage connecting a steering wheel directly to the steering linkage 92. Alternatively, a conventional mechanical steering linkage (not shown) can be provided between a steering wheel and the steering linkage 92 as described in the aforementioned Pat. No. 6,456,925 with the motor 100 acting as a power steering assist if desired. Another type of drive by wire steering control is shown in FIG. 3 wherein, rather than using a single motor, separate electrically operated steering motors 108 and 110 independently pivot the wheels about the wheel axes 18a. For added traction and maneuverability, the steered wheels 18 and 20 can be driven by compact motors (location 18h) or the like. In situations wherein steered front wheels are deemed not to be necessary, the steering structure can be removed completely so the wheels 18 and 20 simply caster and steering control is achieved as described below using full time independent drive of the wheel motor assemblies 34 and 36.

The compact arrangement of the wheel motor assemblies 34 and 36 providing the relatively large accommodation space 40 facilitates mounting of a rear material discharge chute 140 under the area of the seat 42 and generally under the frame 12. The chute 140 is connected to the rear central portion of the mower deck 24. Since the drive structure for the wheels 14 and 16 extends outwardly and away from the accommodation space 40, the chute can have a more direct route rearwardly and chute size can be greater than with convention transmission systems. A cut material hopper 144 is shown connected to the rear frame portion 12r, and the chute 140 opens into the upper front portion of the hopper 144. The rear discharge deck 24 facilitates close trimming on both sides of the vehicle 10. In addition, the construction permits transverse movement of the deck 24 for further trimming enhancement and more top deck clearance for improved tool lift. Electric actuators indicated generally at 150 in FIG. 1 provide implement and tool lift and tool offset functions.

Referring now to FIG. 3, therein is shown an electronic vehicle controller 160 having a steering input 162 from the steering control 50, a speed command and direction input 164 from a foot pedal, and a brake command input 166 from a brake pedal. The pedals and steering control 50 are located at the control area 46 and are shown to include variable resistors providing an analog voltage signal to the controller 160 dependent on the selected position of each operator control. The controller 160 also receives start and run signals from a key switch assembly 168 and engine speed and operating condition information via lines 170.

The vehicle controller 160 calculates the differential speeds of the right and left wheels 14 and 16 such that the vehicle can be steered and controlled with only differential traction drives and caster wheels without need to steer the wheels 14 and 16. The controller 160 then outputs a steering signal via lines 174 and 176 to the steering motors 108 and 110, when the vehicle 10 is so equipped (or to a single steering motor if the steered wheels are mechanically linked for steering), to control the positions of the steered wheels 18 and 20. Feedback lines 178 and 180 (or a single line if a single steering motor is used) provide feedback signals to the controller 160 utilized primarily to verify that the steered wheels 14 and 18 are correctly positioned at vehicle start up. When the steerable wheels 18 and 20 are powered, the controller 160 provides speed control to the wheel drives depending on the steering input at 162 and the foot pedal speed input at 164. The right and left wheel motors 34' and 36' are connected to motor controllers 184 and 186 which received right and left wheel speed commands from the controller 160 dependent also on the steering input at 162 and the foot pedal speed input at 164. Speed and current feedback signals from the right and left wheel motors 34' and 36' are also inputted to the motor controllers at 194 and 196. The current feedback is added to the basic control at 184 and 186 and enables vector control if desired to enhance the control functions.

The steering and drive arrangement provides full time steerable differential drive wherein both rear wheels provide drive at all times for good traction characteristics. The vehicle turns well since the wheels are rotated at speeds matched to the requested turn angle. This control of the individual wheel speed is accomplished without need for a complicated and bulky spin steer transmission. When utilized with a 180 degree or other short radius steering linkage, a high degree of vehicle maneuverability is achieved. The controller 160 utilizes the steering input signal at 162 and the desired ground speed input at 164 from the foot pedals to compute the correct wheel speed for the rear drive motors 34' and 36'. Further details of a control system for controlling the driven wheels may be had by reference to the aforementioned U.S. Pat. No. 6,456,925.

Figure 5:
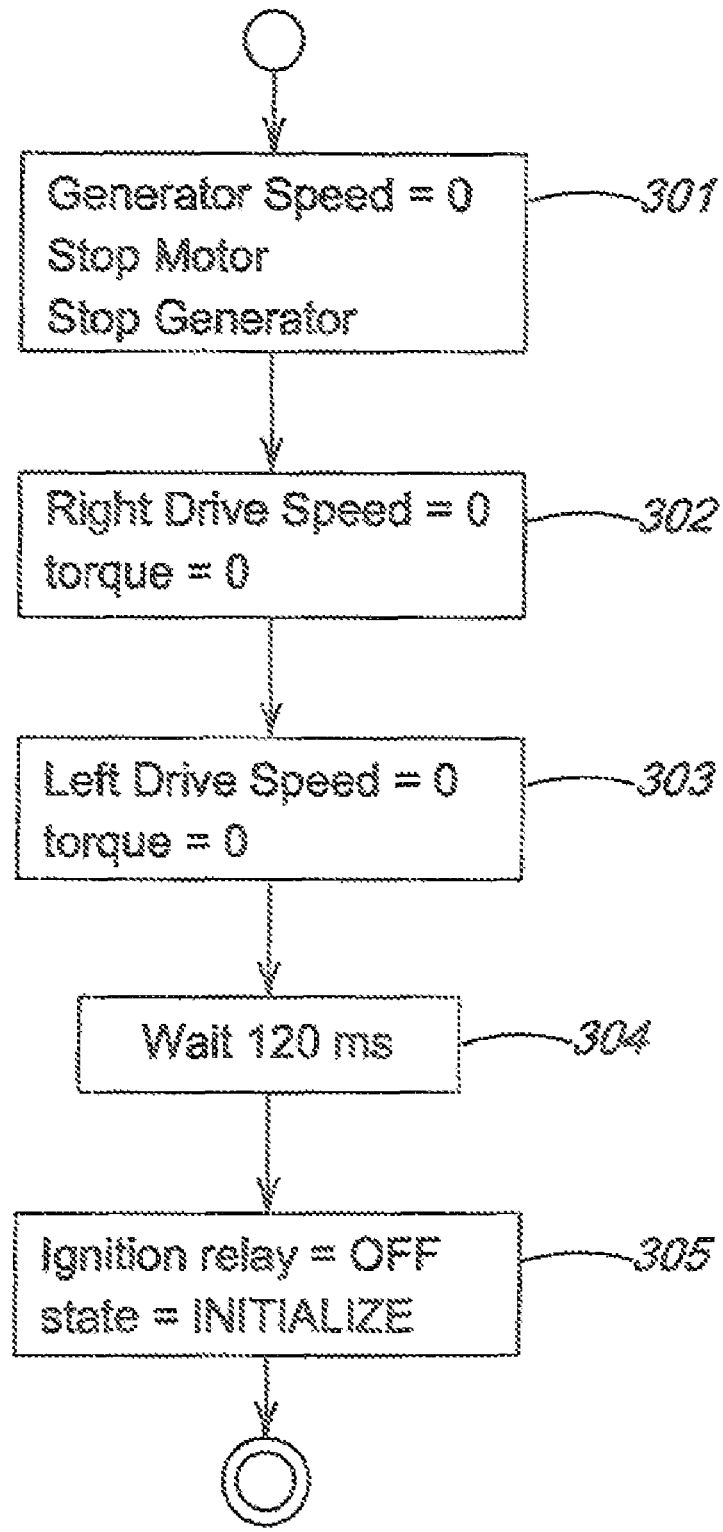
FIG. 5 is a logic flow chart showing shut-down procedure for the vehicle of FIG. 1.

The deck motors 26' (FIG. 3) are controlled with a deck control switch 206 connected to the controller 160. The controller 160 directs power from the bus 76 to the motors 26' when the switch 206 is closed. An inverter switch 208 connected to the controller 160, when closed, turns on the inverter 80 so that power can be supplied through the outlet 82. The controller 160 filters operator speed requests at 164 utilizing a torque control map stored in controller memory. A control algorithm executed by the controller avoids engine overload and engine stoppage by causing electrical load to be taken from the battery pack 74 as necessary and gradually applying generator load to allow a governor on the engine to match engine droop. If the engine 60 stops for any reason, the controller 160 initiates a shut-down routine (300 of FIG. 5). Upon indication at 301 of stoppage, right and left drive speed and torque are set to zero (302 and 303, respectively), and 120 ms delay is initiated at 304. Thereafter, the ignition relay is set to off and the control state is returned to initialization.

Referring to FIGS. 4A-4D, a logic flow chart is shown for the operation of the controller 160. On turn-on of the vehicle 10, inputs are sampled at 400 to determine if there are any problems in the system or if a previous error state has not been corrected, and if so (401), the state is returned to Error at 402, an error message is provided at 403, and shutdown procedure is begun at 404.

Upon indication at 401 that no problems are detected, the state of the system is checked at 410. If the vehicle is in the initiation state, such as occurs at with normal start-up procedures, drive speeds are set to zero at 411 and interlock conditions such as brake on, speed control in neutral and mower deck off are checked at 412. If all the pre-established conditions are met, the ignition relay is turned on at 413 and the state of the key switch 168 is polled at 414. If the switch is in the start position, engine cranking is begun (415). If the switch is not in the start position, the alternator is disengaged at 416. If cranking is indicated at 410, key position is checked at 420, and if starting is indicated, the interlock conditions are checked at 421. If conditions are as prescribed, the starter is turned on at 422, a generator speed is entered at 423. If the generator speed is sufficient for providing proper voltage to the bus 76, the generator is activated at 425 and the run timer is begun at 426. State is set to running at 427.

If the key is not in the start position at 420, the starter is turned off at 430, and a two-second time out is established at 431. Generator speed is checked after two second at 432, and, if sufficient, power generation is begun at 433 and the state is set to running at 434 prior to the next pass through the routine. If at 421 it is determined that not all of the interlock conditions are met, the starter is turned off at 440, a short time-out delay is established at 441 after which the shutdown procedure is begun at 442. If generator speed has not reached an acceptable level at 432 and generator speed is indicated to be below a minimum speed at 451, the shutdown procedure is begun at 452.

Once the state at 410 is determined to be run, the drive to the wheel motor assemblies 34 and 36 at full torque is commanded at 460 and vehicle conditions are checked (FIG. 4D). If the operator is properly positioned relative to the vehicle at 461, the seat error flag is cleared at 462 and the deck switch 206 is polled at 463. If the deck is on and the deck flag is clear at 464, and if the foot pedal is in the neutral condition at 465, the deck is engaged at 466. If an override condition exists, such as mow in reverse switch has been activated (467), the deck override flag is set to true at 468. Otherwise, the deck override flag is cleared at 469. If the foot pedal is not in neutral at 465 and if the foot pedal is in reverse at 470, the deck override flag is checked (471). If the deck override flag has previously been set to true at 468 indicating a proper override condition exists, the deck engagement is enabled at 472. Otherwise, the deck is disengaged at 474 and the deck error flag is set at 475. If the foot pedal is not in reverse (470), the deck override flag is set to false at 480 and the deck is engaged at 481.

If at 461 it is determined that seat switch is off and at 483 (FIG. 4C) the vehicle brake is not engaged, shutdown is initiated at 484. If the seat switch is off (461) and the brake is on (483) the deck switch is polled at 485 and, if off, the deck is disengaged (486) and the deck error flag is set at 487. If the seat switch is on at 461 and the deck off indication is received at 463, the error deck flag is checked at 488 and deck override flag is checked at 489 before disengaging the deck at 490. The steering algorithm 494 continues after condition checks.

Having described the preferred embodiment, it will become apparent that various modifications can be made without departing from the scope of the invention as defined in the accompanying claims.

The invention claimed is:

1. A utility vehicle having a frame supported for forward movement over ground by front and rear wheels, the vehicle including an engine and an electrical power source driven by the engine, drive structure connected to at least one of the wheels and powered from the engine for moving the vehicle over the ground where vegetation is present, a deck supported by the frame and extending transversely to the forward direction, a seat located rearwardly and above the deck, the deck including cutter structure for severing the vegetation and discharge structure providing a path for the severed vegetation, characterized in that the drive structure is offset to one side of the discharge structure and the discharge structure is located substantially under the frame rearwardly of the engine to provide a generally unencumbered path between the deck and a discharge location offset from the frame, wherein the cutter structure includes an electric motor supported by the deck and connected to the electrical power source, and the drive structure includes first and second electric drive motors located on opposite sides of the discharge structure rearwardly of the cutter structure, wherein the cutter structure includes two electric blade motors supported by the deck and connected to the electrical power source, and the first and second electric drive motors define a rearwardly directed accommodation space between the drive wheels for accommodating the discharge structure, and an electric tool actuator providing movement of the deck located in the accommodation space above the discharge structure rearwardly adjacent the seat.

2. The utility vehicle as set forth in claim 1 wherein the drive structure is located on opposite sides of the frame outwardly of the discharge structure.

* * * * *